United States Patent
Mikami et al.

(10) Patent No.: US 7,072,968 B2
(45) Date of Patent: Jul. 4, 2006

(54) BANDWIDTH CONTROL SERVICE MANAGEMENT APPARATUS

(75) Inventors: Koji Mikami, Fukuoka (JP); Hirofumi Kobayashi, Fukoka (JP); Hiroshi Yoshitake, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 698 days.

(21) Appl. No.: 09/773,329

(22) Filed: Jan. 31, 2001

(65) Prior Publication Data

US 2002/0091663 A1 Jul. 11, 2002

(30) Foreign Application Priority Data

Oct. 2, 2000 (JP) ............................. 2000-301727

(51) Int. Cl.
  *G06F 15/16* (2006.01)
  *G06F 15/173* (2006.01)
  *H04J 3/18* (2006.01)
  *H04J 3/16* (2006.01)
  *H04J 1/16* (2006.01)

(52) U.S. Cl. ...................... 709/229; 370/477; 370/468; 370/252; 709/200; 709/225

(58) Field of Classification Search ................ 370/230, 370/208, 468, 477, 252; 340/506; 706/25; 709/200, 225
See application file for complete search history.

(56) References Cited

U.S. PATENT DOCUMENTS

| 6,311,175 B1 * | 10/2001 | Adriaans et al. ............... 706/25 |
| 6,473,394 B1 * | 10/2002 | Marchok et al. ............ 370/208 |
| 6,590,865 B1 * | 7/2003 | Ibaraki et al. ............... 370/230 |
| 6,671,285 B1 * | 12/2003 | Kirkby et al. ............... 370/468 |
| 6,693,533 B1 * | 2/2004 | Ebata et al. ................ 340/506 |
| 6,701,342 B1 * | 3/2004 | Bartz et al. ................. 709/200 |
| 6,738,348 B1 * | 5/2004 | Rollins ........................ 370/230 |
| 6,845,106 B1 * | 1/2005 | McKinnon et al. .......... 370/477 |
| 2002/0039352 A1 * | 4/2002 | El-Fekih et al. ............. 370/252 |
| 2004/0162901 A1 * | 8/2004 | Mangipudi et al. .......... 709/225 |

FOREIGN PATENT DOCUMENTS

| JP | 11-225169 | 8/1999 |
| JP | 11-275145 | 10/1999 |

OTHER PUBLICATIONS

60205963.*

* cited by examiner

*Primary Examiner*—John Follansbee
*Assistant Examiner*—Philip Lee
(74) *Attorney, Agent, or Firm*—Katten Muchin Rosenman LLP

(57) ABSTRACT

In a bandwidth control service management apparatus of a network operated by a network offerer and a customer, an available bandwidth of a premium bandwidth control service demand, accepted from the customer, with a higher priority than a regular bandwidth control service of best effort type, is compared with an applied threshold value, accepted from a network offerer through a network interface 7 to determine an availability of the premium bandwidth control service. The result is notified to the customer through the customer interface 2, and the serviceable bandwidth manager 3 is provided which demands that the network should secure a bandwidth in order that the customer who has received the notification of a service permission can start the premium bandwidth control service when the premium bandwidth control service is determined to be available. This serviceable bandwidth manager 3 notifies a present applied threshold value in response to a collection demand by the network offerer, and adopting a changed applied threshold value for the determination when the network offerer has changed the applied threshold value.

5 Claims, 10 Drawing Sheets

BANDWIDTH CONTROL SERVICE MANAGEMENT APPARATUS

BACKGROUND OF THE INVENTION

1. Field of the Invention

The present invention relates to a bandwidth control service management apparatus, and in particular to an apparatus for managing a bandwidth control service offered within a network operated by a network offerer such as an Internet Service Provider (ISP), and a customer.

2. Description of the Related Art

With a spread of personal computers and cellular phones, those who use the Internet have been rapidly increasing. Also, with sequential appearances of new services over the Internet such as an on-line banking and an Internet telephone, huge application programs which exceed several tens of megabytes and multi-media contents such as music and video have been treated, so that the amount of exchanged information has been also increasing year by year.

In such a background, a communication environment with high quality, speed and reliability has been intensively demanded by not only customers who use the Internet on business but also individual customers.

In response to such customer's needs, a network offerer offers a high quality communication service called IP-VPN. This service guarantees a minimum bandwidth for a contracted customer. When using this service, the customer is required to preliminarily designate a desired guarantee bandwidth at the time of contracting, and to pay a predetermined service rate (fee) to the network offerer according to the bandwidth per month.

It is to be noted that for the high quality communication service offered to the customer, there is a method in which a priority control of the communication from the customer is performed according to a grade (class) the customer has contracted, in addition to the method in which the bandwidth the customer has designated is guaranteed.

The service which enables the network offerer to offer the high quality communication environment to the customer by one of those methods will now be called a bandwidth control service.

(1) Since requiring a preliminary contract per month, the present bandwidth control service is comparatively expensive and hard to use for the customer whose frequency in use is low. Also, the contract is made on the assumption of use for a predetermined period (e.g. half a year), so that such a service is hard to spread over the individual customer.

Furthermore, no provider adopts, at the present, the bandwidth control service which can be dynamically and promptly used under the customer's initiation. Even if the situation where the customer urgently desires to down load some data in a short time occurs, it is impossible to use the bandwidth control service only for the situation.

As a technique to solve such a problem, a method is devised in the "Japanese Patent Application Laid-open No.5-316205" in which a customer (node) himself (itself) sets a communication cost and a communication quality based on the importance of communication and traffic status so that the transmission rate, route, and communication cost are dynamically controlled.

However, it is only the node where the customer is accommodated that the customer can set the communication quality and control the service. The customer can not control other nodes relating to the communication such as a node to which another customer, with whom the former customer is communicating, connects.

Accordingly, in order to dynamically and promptly apply the bandwidth control service in the network of the network offerer, it is required that the network offerer introduces the node which supports the method to the whole network, and that the customer or the network offerer performs the same setting to all of the relating nodes.

Also, this method has no constitution in which a plurality of bandwidth control services executed over the network of the network offerer are managed. Therefore, when a plurality of customers set a high communication quality at the same time in the network, there is a possibility that the network is congested, resulting in a decreased communication quality.

(2) In order to obey the quality contracted with the customer when the network offerer performs the dynamic bandwidth control service, it is required to secure a certain extent of a network resource according to the number of the customers. However, reinforcing the network resource on the assumption that many customers use the service at one time requires an introduction cost, and incurrs a high possibility that much resource is generally kept unoccupied, or wasted.

As a method of making the most of the limited network resource efficiently, the method is devised in the "Japanese Patent Application Laid-open No.11-122394" in which an appreciate accounting unit price is set according to a traffic status, and in which a communication demand amount corresponding to the network resource is always awakened.

However, this method would require a controller and a price display device on the customer's side, so that a new equipment investment for the customer is required.

Also, this method has a constitution in which the accounting rate rises higher as the network is congested, and the limit of the number of the customers or the like is not made clear especially. Accordingly, if the bandwidth control service is offered to many customers, there is a possibility that the service rate becomes extremely expensive, or that the network is congested and the communication quality contracted with the customer can not be obeyed.

SUMMARY OF THE INVENTION

It is accordingly an object of the present invention to provide a bandwidth control service management apparatus of a network which is operated by a network offerer and a customer, and which can change and release a bandwidth control service dynamically and promptly under a customer's initiation.

FIG. 1 is a diagram schematically showing a whole arrangement of a bandwidth control service management apparatus 1 for achieving the above-mentioned object according to the present invention. In FIG. 1, a service demand interface display 2 connected to a customer (customer's terminal) is connected to a serviceable bandwidth manager 3, which is connected to a timer manager 4.

Also, the serviceable bandwidth manager 3 is connected to an additional rate manager 5, a service reservation manager 6, and a network interface display 7 together with a network manager on the network side. The network interface 7 is connected to a network offerer.

First of all, the present invention according to claim 1 comprises: a customer interface 2 for accepting, from the customer, an available bandwidth of a premium bandwidth control service demand with a higher priority than a regular bandwidth control service of best effort type, a network interface 7 for accepting an applied threshold value of the premium bandwidth control service from the network offerer, and a serviceable bandwidth manager 3 for comparing an available bandwidth of the premium bandwidth control service demand with the applied threshold value to determine whether or not the premium bandwidth control service is available, for notifying the result to the customer through the customer interface 2, and for demanding that the network should secure a bandwidth in order that the customer who has received the notification of a service permission can start the premium bandwidth control service when the premium bandwidth control service is determined to be available, the serviceable bandwidth manager 3 notifying a present applied threshold value in response to a collection demand by the network offerer, and adopting a changed applied threshold value for the determination when the network offerer has changed the applied threshold value.

Namely, the customer interface 2 accepts, according to the demand from the customer, the demand of change to a premium bandwidth control service, which applies a bandwidth guarantee, a priority control, or the like, and will be hereinafter sometimes simply referred to as bandwidth control service, with higher priority (grade) than a common regular bandwidth control service of a best effort type the customer presently enjoys.

The change demand to the premium bandwidth control service is notified to the serviceable bandwidth manager 3 from the customer interface 2.

The serviceable bandwidth manager 3 compares the available bandwidth demanded by the customer with the applied threshold value relating to an available bandwidth required for performing the premium bandwidth control service set by the network offerer, determines whether or not the demanded premium bandwidth control service is offerable, so that the result is notified to the customer through the customer interface 2.

When the premium bandwidth control service is offerable, the serviceable bandwidth manager 3 demands that the network side (network manager) should secure the bandwidth in order that the demanded premium bandwidth control service may be started.

On the other hand, the network offerer sends the collection demand for the applied threshold value of the premium bandwidth control service to the serviceable bandwidth manager 3. In response, the serviceable bandwidth manager 3 collects the information relating to the applied threshold value to be notified to the network offerer through the network interface 7.

When changing the applied threshold value, the network offerer notifies the changed value of the applied threshold value to the serviceable bandwidth manager 3 through the network interface 7. The serviceable bandwidth manager 3 changes the applied value to the notified one, and determines, as mentioned above, whether or not the premium bandwidth control service is offerable with this new applied threshold value being made a standard.

Thus, it becomes possible to dynamically and promptly perform the premium bandwidth control service with the higher priority in response to the customer's demand based on the applied threshold value set and changed by the network offerer.

Also, in the present invention of claim 2 according to claim 1, a timer manager 4 is provided which monitors an applied time of the premium bandwidth control service received by the customer through the customer interface 2, and which demands a release of the premium bandwidth control service from the serviceable bandwidth manager 3, when the applied time has elapsed.

Namely, when the applied time of the premium bandwidth control service is demanded by the customer, the applied time is notified to the timer manager 4 from the serviceable bandwidth manager 3.

The timer manager 4 manages the notified application time information, and demands the release of the premium bandwidth control service from the serviceable bandwidth manager 3 at the time when the applied time has elapsed.

Accordingly, the serviceable bandwidth manager 3 notifies the release instructions of the premium bandwidth control service of the corresponding customer to the network, thereby enabling the automatic release of the service application when the service applied time designated by the customer has elapsed.

Also, in the present invention of claim 3 according to claim 1, a service reservation manager 6 is provided which reserves and manages a customer whose premium bandwidth control service demand is rejected by the serviceable bandwidth manager 3, and which notifies to the customer that the premium bandwidth control service becomes available at that time.

Namely, when the premium bandwidth control service with the higher priority demanded by the customer is not offerable, the serviceable bandwidth manager 3 notifies the fact that the service is not offerable. Thus, it becomes possible for the customer to request the reservation of the premium bandwidth control service, and when the reservation is requested through the customer interface 2, the serviceable bandwidth manager 3 transfers the customer information to the service reservation manager 6 and demands the reservation of the premium bandwidth control service. The service reservation manager 6 manages the received customer reservation information.

When the premium bandwidth control service becomes offerable, the serviceable bandwidth manager 3 notifies the fact to the service reservation manager 6. The service reservation manager 6 notifies that the premium bandwidth control service has become offerable to the customer who has reserved the service through the customer interface 2 based on the customer reservation information. Thus, it becomes possible to automatically notify the serviceability when the service becomes available.

Also, in the present invention of claim 4 according to claim 1, an additional rate manager 5 is provided which manages an accounting rate set according to a remaining bandwidth of the premium bandwidth control service and forming an additional rate calculation standard, and which notifies the accounting rate corresponding to the remaining bandwidth of the premium bandwidth control service at a time when a service is demanded by the customer to the serviceable bandwidth manager, while the premium bandwidth control service is offered.

Namely, the accounting rate which forms the additional rate calculation standard according to the remaining bandwidth when the premium bandwidth control service is offered is preliminarily stored in the additional rate manager 5.

When the accounting rate for the premium bandwidth control service is inquired by the serviceable bandwidth manager 3, the additional rate manager 5 notifies the accounting rate set. Thus, accounting the additional rate calculated based on the accounting rate according to the servicing status of the premium bandwidth control service designated by e.g. the network offerer can be performed.

Furthermore, in the present invention of claim 5 according to claim 4, when the customer releases the premium bandwidth control service, the additional rate manager 5 changes the accounting rate to a new accounting rate considering the released bandwidth for accounting.

Namely, when recognizing the release of the premium bandwidth control service for a certain customer, the serviceable bandwidth manager 3 notifies the customer information and the release to the additional rate manager 5. The additional rate manager 5 changes the accounting rate to the new accounting rate, from which the bandwidth for the customer who has released the service is removed, and notifies the new accounting rate to the serviceable bandwidth manager 3, thereby enabling automatic recalculation of the additional rate and accounting of the adequate additional rate.

BRIEF DESCRIPTION OF THE DRAWINGS

Throughout the figures, like reference numerals indicate like or corresponding components.

DESCRIPTION OF THE EMBODIMENTS

Figure 1:
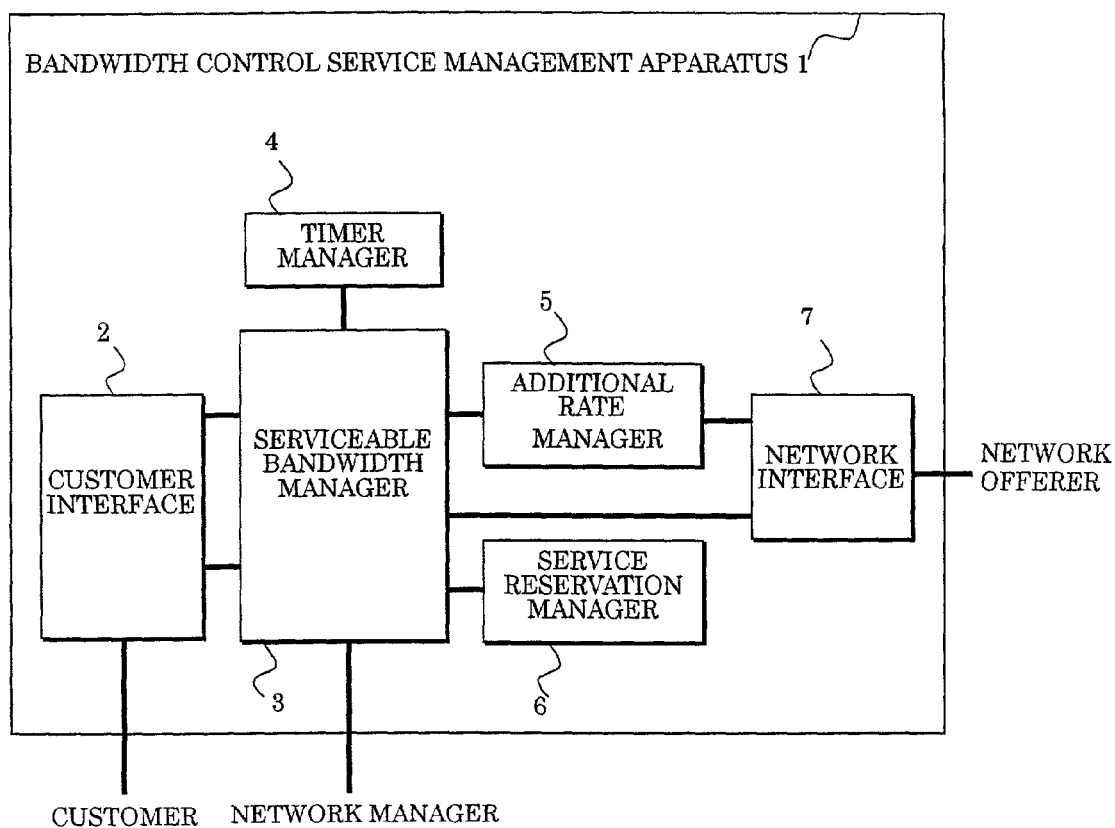
FIG. 1 is a block diagram showing a principle of a bandwidth control service management apparatus according to the present invention.
Figure 2:
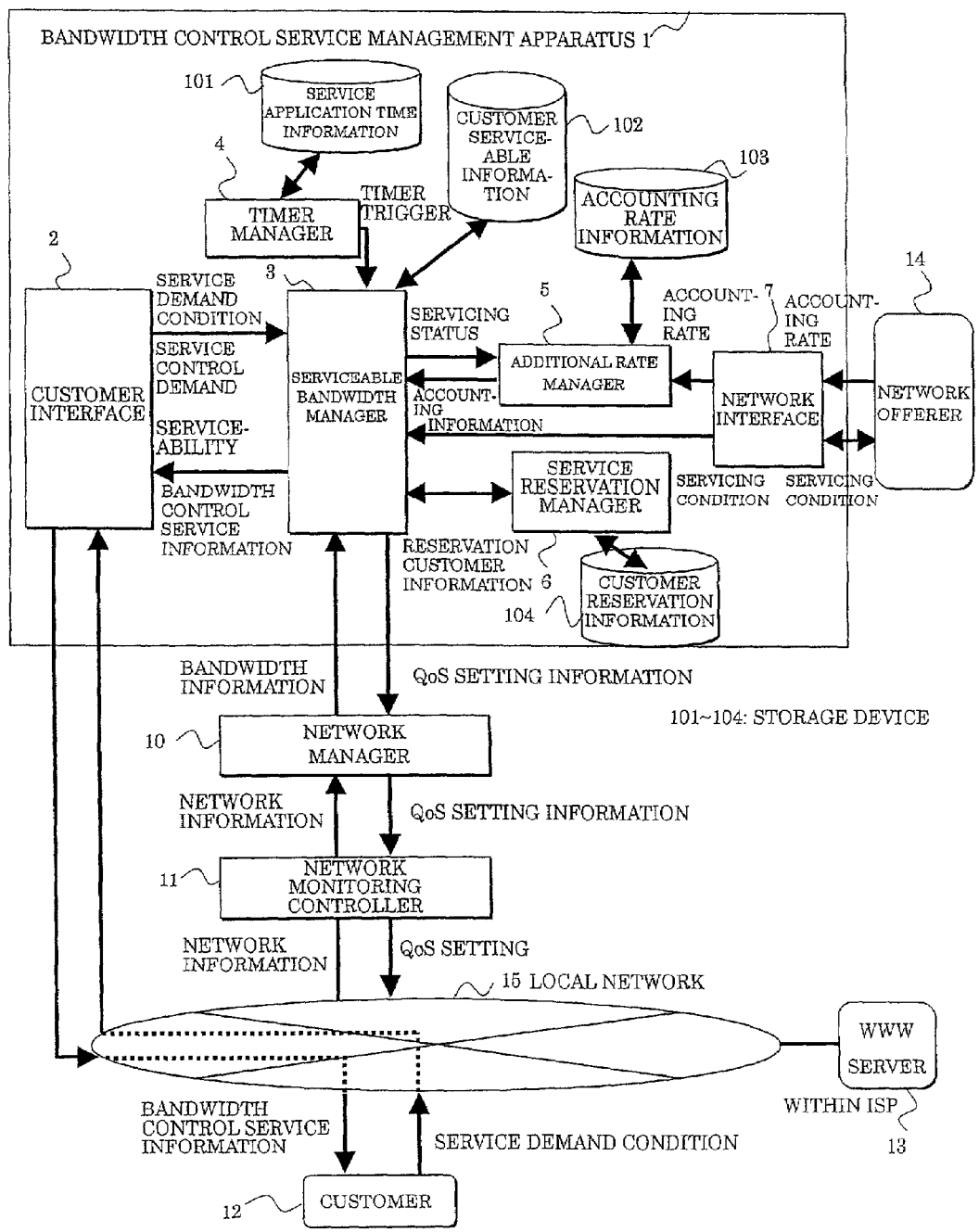
FIG. 2 is a block diagram of an arrangement showing an embodiment of a bandwidth control service management apparatus according to the present invention.

FIG. 2 shows an embodiment of a bandwidth control service management apparatus according to the present invention schematically shown in FIG. 1, and especially shows one embodiment in the whole network.

Namely, the bandwidth control service management apparatus 1 according to the present invention is connected between a network offerer 14 and a network 15, which is connected so as to provide a customer (customer's terminal) with bandwidth control service information and to receive a service demand from a customer 12. Also, the network 15 is connected to a WWW server 13 within an Internet service provider (ISP).

Furthermore, a network manager 10 and a network monitoring controller 11 are connected in series between the network 15 and the serviceable bandwidth manager 3 in the bandwidth control service management apparatus 1. The network information from the network 15 is provided to the serviceable bandwidth manager 3, and QoS (Quality of Service) setting information from this serviceable bandwidth manager 3 is provided to the network 15.

Moreover, the bandwidth control service management apparatus 1 is equipped with storage devices 101–104 storing "service application time information", "customer serviceable information", "accounting rate information", and "customer reservation information" as a data base respectively.

The storage device 101, among these storage devices, storing the service application time information is mutually connected to the timer manager 4, the storage device 102 storing the customer serviceable information is mutually connected to the serviceable bandwidth manager 3, the storage device 103 storing the accounting rate information is mutually connected to the additional rate manager 5, and furthermore the storage device 104 storing the customer reservation information is mutually connected to the service reservation manager 6.

Figure 3:
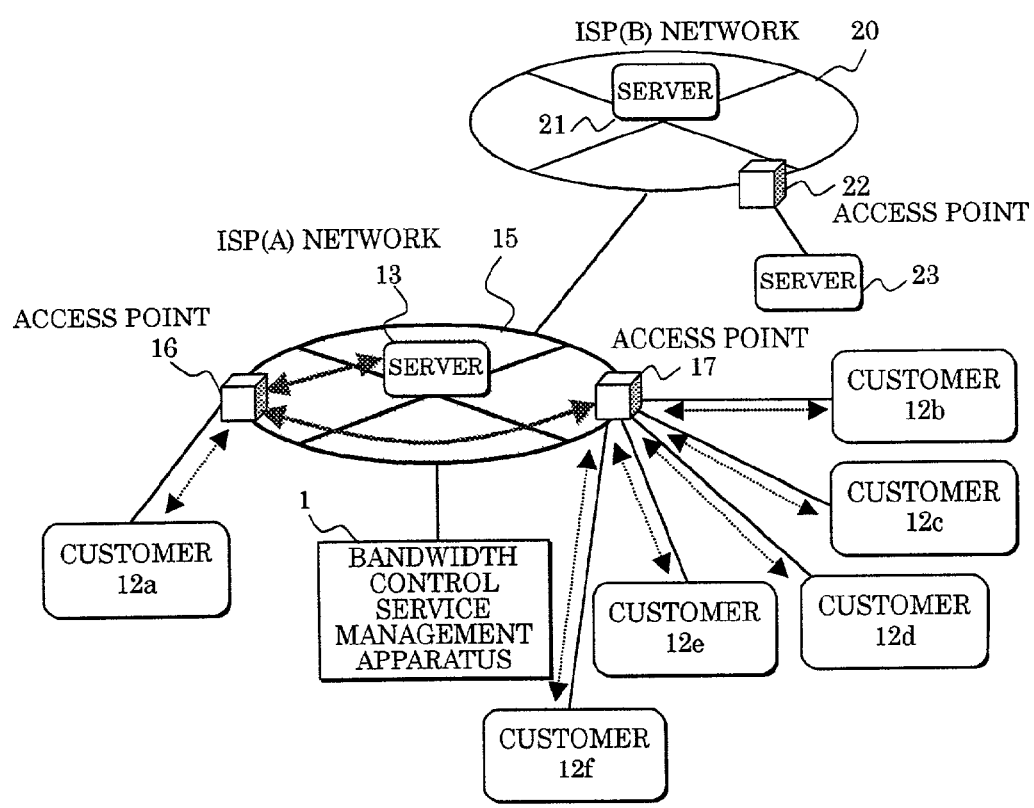
FIG. 3 is a diagram showing an arrangement of a whole system in a network where a bandwidth control service management apparatus according to the present invention is applied.

FIG. 3 shows a general network arrangement of the Internet, in which two Internet networks 15 and 20 are shown. Among these networks, the network 15 corresponds to the network 15 connected to the bandwidth control service management apparatus 1 according to the present invention. The network 15 is connected to a customer 12a through an access point 16 and is connected to customers 12b–12f through an access point 17.

It is to be noted that the network 20 has a server 21 and is connected to another server 23 through an access point 22. Also, a bandwidth control service is performed between arrows, and an applied range where such a bandwidth control service is performed is the network 15 shown by hatches.

In the network shown in FIG. 3, the serviceable bandwidth manager 3 in the bandwidth control service management apparatus 1 shown in FIGS. 1 and 2 periodically collects the bandwidth available status of the network 15 from the network manager 10 through the network monitoring controller 11 to grasp the bandwidth available status.

Figure 4:
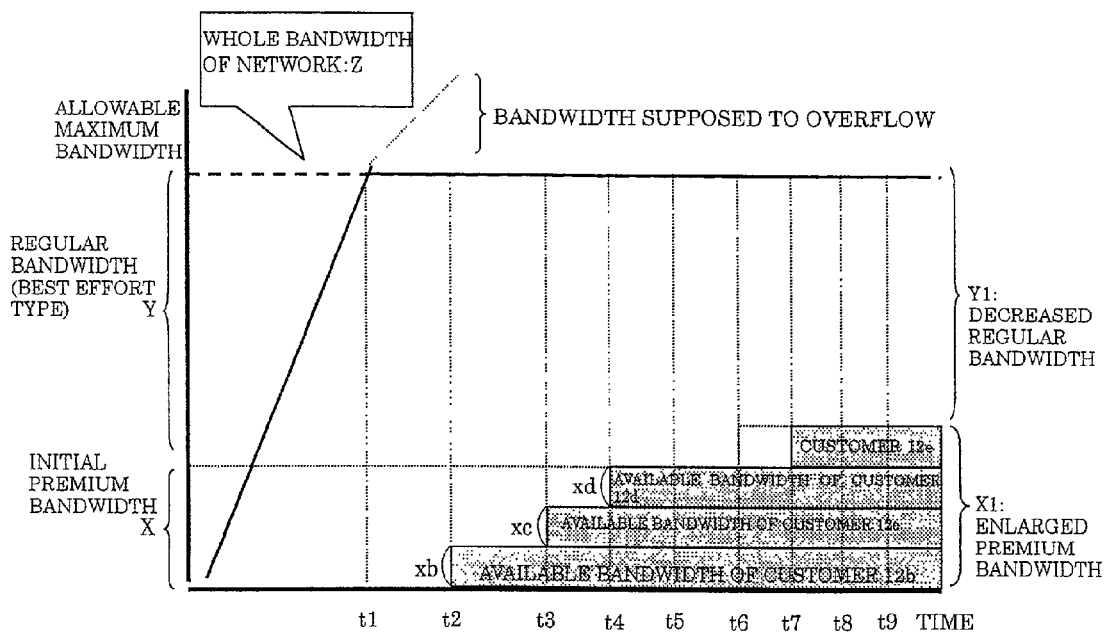
FIG. 4 is a sequence diagram showing an application example of a bandwidth control service by a bandwidth control service management apparatus according to the present invention.

FIG. 4 is a sequence graph showing a bandwidth available status of the network 15 when the bandwidth control service is applied in the system arrangement as shown in FIG. 3 by the bandwidth control service management apparatus 1 according to the present invention. The time series data of the bandwidth control service at the points of t1–t8... in this graph are shown in the following Table 1.

TABLE 1

Time series data of bandwidth control service

|  | Point t1 | Point t2 | Point t3 | Point t4 | Point t5 | Point t6 | Point t7 | Point t8 |
|---|---|---|---|---|---|---|---|---|
| Maximum premium bandwidth | X | X | X | X | X | X1 | X1 | X1 |
| Available premium bandwidth | 0 | xb | xb + xc | xb + xc + xd | xb + xc + xd | xb + xc + xd | xb + xc + xd | xb + xc + xd + xe |
| Remaining premium bandwidth | X | X − xb | X − xb − xc | X − xb − xc − xd | X − xb − xc − xd | X1 − xb − xc − xd | X1 − xb − xc − xd | X1 − xb − xc − xd − xe |
| Presence/Absence of remaining Premium | Presence | Presence | Presence | Presence | Absence | Presence | Presence | Absence |

Hereinafter, embodiments of a bandwidth control service management apparatus according to the present invention will now be described referring to flow charts in FIGS. 5–10 and the above Table 1.

Embodiment (1)

Figure 5:
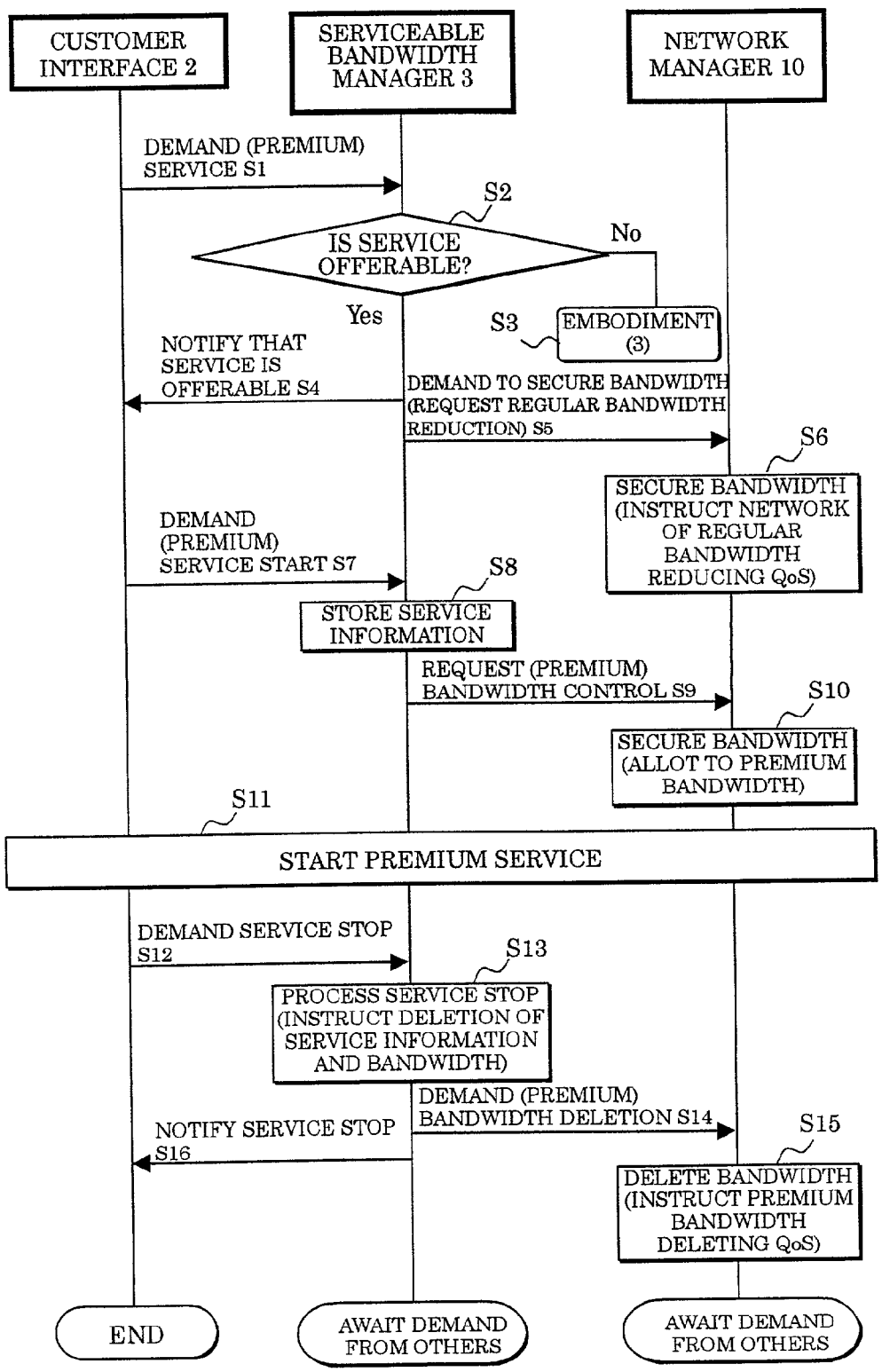
FIG. 5 is a flow chart showing a process example (1) of an embodiment (1) of a bandwidth control service management apparatus according to the present invention.

FIG. 5 shows a basic control process flow by an embodiment (1) of a bandwidth control service management apparatus according to the present invention.

The customers 12a–12f are assumed to firstly use their own (local) network 15, as shown in FIG. 4, with the regular bandwidth control service of best effort type instead of the premium bandwidth control service, and are assumed to have used the whole bandwidth "Z" of the network at the point of t1. Accordingly, it is shown that if the regular bandwidth control service is performed after the point of t1, an allowable bandwidth "Z" of the network is exceeded to overflow, and that the transmission delay of the network occurs.

Therefore, when detecting the transmission delay of its own network 15, the customer 12b, for example, demands an arbitrary available bandwidth "xb" from the customer interface 2 for the premium bandwidth control service. The available bandwidth "xb" demanded is notified to the serviceable bandwidth manager 3 from the bandwidth control customer interface 2 (at step S1 of FIG. 5).

The serviceable bandwidth manager 3 compares, under the present traffic status, a value ("X" at first) obtained by subtracting a bandwidth which is now being used from an initial allowable maximum bandwidth "X" of the premium bandwidth control service with the available bandwidth "xb" demanded (at step S2).

As the result of the comparison, when the premium bandwidth control service is not offerable (X≦xb), a reservation process by an embodiment (3), for example, described later is executed (at step S3) When the service is offerable (X>xb), the fact is notified to the customer interface 2 (at step S4), and the instructions for securing the bandwidth by reducing only the available bandwidth "xb" of the regular bandwidth control service are transmitted to the network manager 10 as QoS information (at step S5).

The network manager 10 transmits the designated QoS information to the network monitor controller 11, which requests controls from the network 15 composed of network apparatuses (at step S6).

At this time, the network apparatuses in the network 15 control the premium bandwidth control service to the customer 12b by RSVP, Diffserv, or the like. Also, it is possible to use a bandwidth control function which composes each network.

When receiving the notification that the premium bandwidth control service is offerable from the customer interface 2, the customer 12b demands the offer of the premium bandwidth control service from the customer interface 2. The customer interface 2 which has received this demand requests the information of the customer 12b together with the premium bandwidth control service demand from the serviceable bandwidth manager 3 (at step S7).

The serviceable bandwidth manager 3 which has received the demand stores the information of the customer 12b, the start time, and the like in a queue (not shown) for a premium bandwidth control service offerer to be managed (at step S8). Also, the serviceable bandwidth manager 3 transmits the QoS information for the available bandwidth demand of the premium bandwidth control service to the network manager 10 (at step S9).

For the distribution to the premium bandwidth control service, the network manager 10 transmits the QoS information to the network monitoring controller 11, and demands the control from the network apparatuses (at step S10). At this time, the network apparatuses in the network 15 control the bandwidth control service to the customer 12b by the RSVP, the Diffserv, or the like.

The remaining available bandwidth at this time is "X-xb". As shown in FIG. 4, unless the remaining ones for the available bandwidths "xc" and "xd" at the points of t3 and t4 exceed the initial allowable maximum available bandwidth "X" in the same way as the above example, the premium bandwidth control service is offerable to the customers 12c and 12d.

Then, it is assumed that the customer 12e detects a delay of service at the point of t5 and demands the available bandwidth "xe" of the premium bandwidth control service from the customer interface 2. This demand is notified to the serviceable bandwidth manager 3 from the customer interface 2. The serviceable bandwidth manager 3 which has received the notification compares the present remaining available bandwidth X-xb-xc-xd with the available bandwidth "xe" demanded.

Since the remaining available bandwidth X-xb-xc-xd is now almost zero in the example of FIG. 4, it is determined from the comparison that there is no offerable premium bandwidth control serviceable bandwidth and that the service is not offerable, so that the fact is notified to the customer 12e through the customer interface 2 as in an embodiment (3) described later.

Figure 6:
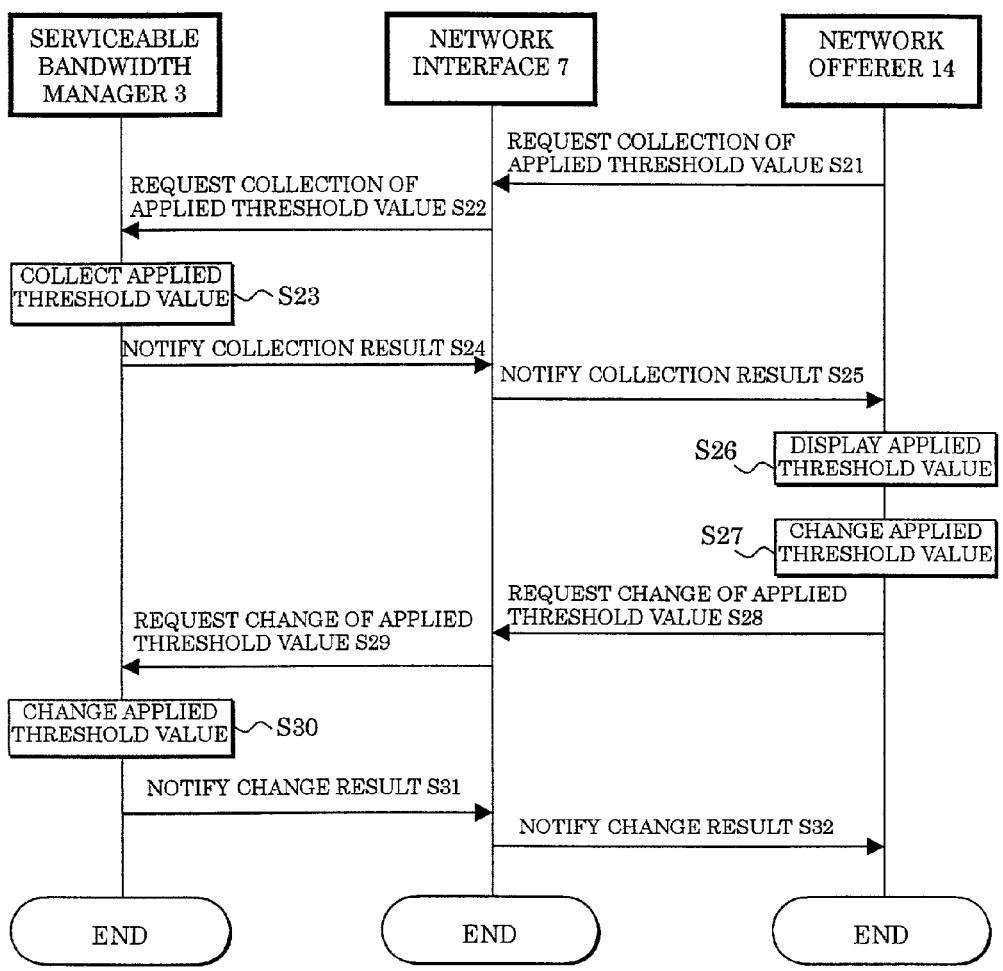
FIG. 6 is a flow chart showing a process example (2) of an embodiment (1) of a bandwidth control service management apparatus according to the present invention.

On the other hand, the network offerer 14 continuously demands, as shown in FIG. 6, the collection of the applied threshold values on the available bandwidths of the regular bandwidth control service and the premium bandwidth control service from the serviceable bandwidth manager 3 through the network interface 7 as a necessary condition for working the present premium bandwidth control service (at steps S21 and S22 in FIG. 6).

The serviceable bandwidth manager 3 collects the present applied threshold values, i.e. the initial maximum available bandwidth=X of the premium bandwidth control service and the initial maximum available bandwidth=Y of the regular bandwidth control service, and offers the values to the network offer 14 through the network interface 7 to be displayed (at steps S23–S26).

At this time, the network offerer 14 changes the threshold values by enlarging the initial maximum available bandwidth=X of the premium bandwidth control service to X1 and by decreasing the initial maximum available bandwidth=Y of the regular bandwidth control service to Y1, and demands the threshold values change from the serviceable bandwidth manager 3 through the network interface 7 (at steps S27–S29).

The serviceable bandwidth manager 3 updates the above available bandwidths "X" and "Y" held to "X1" and "Y1" respectively (at step S30). The result of this update is notified to the network offerer 14 (at steps S31 and S32).

The applied threshold value still remains to be "X" even at the point of t6 subsequent to the point of t5. However, if the customer 12e again demands the available bandwidth "xe" of the premium bandwidth control service from the customer interface 2 at the following point of t7, this demand is notified to the serviceable bandwidth manager 3, so that the present remaining available bandwidth X1-xb-xc-xd of the premium bandwidth control service is compared with the demanded available bandwidth "xe".

Since it is known from the comparison result that the available bandwidth of the premium bandwidth control service can be now secured (X1-xb-xc-xd>xe), the fact is notified to the customer 12e through the customer interface 2. By executing the same processes (steps S2–S10) as the case of the customer 12b, offering the premium bandwidth control service to the customer 12e is started (at step S11 in FIG. 5).

The designation of the applied threshold value necessary for working the premium bandwidth control service in the above process enables the network offerer to more easily perform the bandwidth control of the network. Also, it becomes possible to perform a dynamic bandwidth control service initiated by the customer within the network.

It is to be noted that in order to finish the premium bandwidth control service, as shown in FIG. 5, a service stop demand is sent from the customer to the serviceable bandwidth manager 3 to be processed (at steps S12 and S13). Also, the bandwidth deleting demand of the premium bandwidth control service is performed to the network manager 10 (at steps S14 and S15), so that the service stop is notified to the customer (at step S16).

Embodiment (2)

Figure 7:
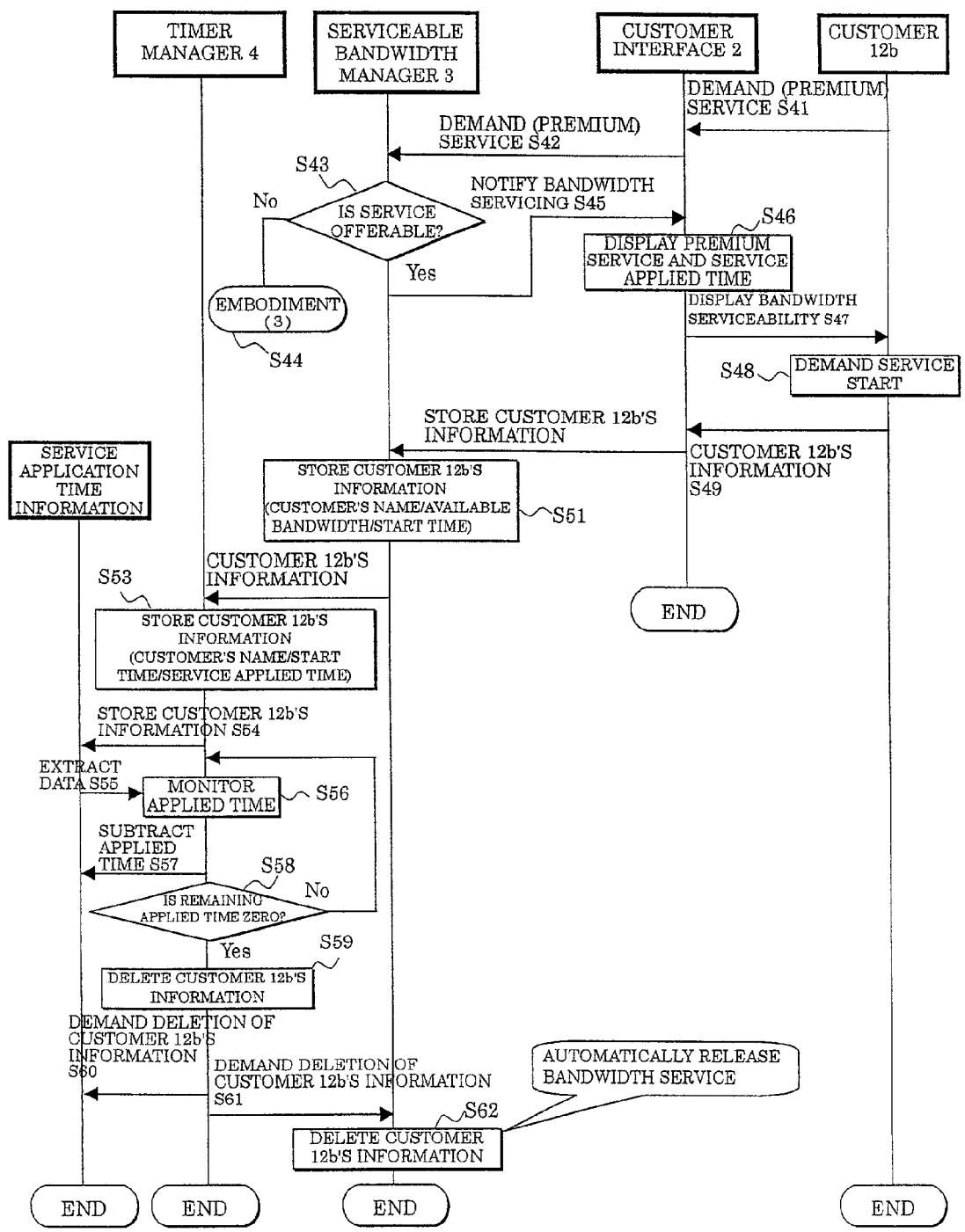
FIG. 7 is a flow chart showing a process example of an embodiment (2) of a bandwidth control service management apparatus according to the present invention.

FIG. 7 shows a process flow of a service applied time by an embodiment (2) of a bandwidth control service management apparatus according to the present invention. In this embodiment, in order to perform a service applied time process, the storage device 101 shown in FIG. 2 is connected to the timer manager 4, and the storage device 102 is connected to the serviceable bandwidth manager 3. The service application time information and the customer serviceable information shown in the following tables are stored in the storage devices 101 and 102.

TABLE 2

Service application time information (101)

| Customer's name | Start point | Application time (min.) |
| --- | --- | --- |
| 12b | t2 | 10 |
| 12c | t3 | 20 |
| 12d | t3 | 60 |

TABLE 3

Customer serviceable information (102)

| Customer's name | Available bandwidth | Start point |
| --- | --- | --- |
| 12b | Premium | t2 |
| 12c | Premium | t3 |
| 12d | Premium | t4 |
| 12e | Premium | t7 |

Firstly, in the same way as the above embodiment (1), when the demand of the premium bandwidth control service is sent from the customer (customer 12b in this example) to the serviceable bandwidth manager 3 through the customer interface 2 (at steps S41 and S42 in FIG. 7; at the point of t2 in FIG. 4), the serviceable bandwidth manager 3 determines serviceability (at step S43), so that the screen on which the premium bandwidth control service and the service application time can be designated is sent to the customer 12b from the customer interface 2 (at steps S45–S47). It is to be noted that when the premium bandwidth control service is not offerable, the embodiment (3) is executed in the same way as step S2 of the embodiment (1) (at step S44).

In response to this, the customer 12b inputs a premium bandwidth control service start demand and the service application time "10 minutes" (at step S48) to be notified to the customer interface 2 (at step S49).

The customer interface 2 which has received this notification transmits the customer 12b information (customer's name/available bandwidth/start time/applied time) to the serviceable bandwidth manager 3 (at step S50).

The serviceable bandwidth manager 3 stores "customer's name/available bandwidth/start time" among those in the storage device 102 as the customer serviceable information (at step S51), and simultaneously transmits the "customer's name/start time/service application time" of the customer 12b's information to the timer manager 4 (at step S52) to be stored in the storage device 101 as the customer service application time information (at steps S53 and S54).

The timer manager 4 further monitors the "application time" of the service application time information (at steps S55 and S56), and periodically subtracts the application time (at steps S57 and S58).

When the remaining service application time becomes zero minute, the timer manager 4 deletes the customer 12b's information of the service application time information (at step S59), and demands the deletion of the customer 12b's information in the customer serviceable information and the service release from the storage device 101 and the serviceable bandwidth manager 3 (at steps S60 and S61).

The serviceable bandwidth manager 3 which has received the release demand deletes the customer 12b's information of the customer serviceable information in the storage device 102, and the process is performed in the same procedure as step S13 and the following steps in FIG. 5 (at steps S62), so that the service application of the customer 12b is ended.

It is to be noted that in the example of Table 2, the customers 12c and 12d respectively designate the application time "20 minutes" and "60 minutes" in the same way as the above customer 12b.

Thus, the designation of the service application time on enjoying the premium bandwidth control service enables to automatically release the premium bandwidth control service.

Embodiment (3)

Figure 8:
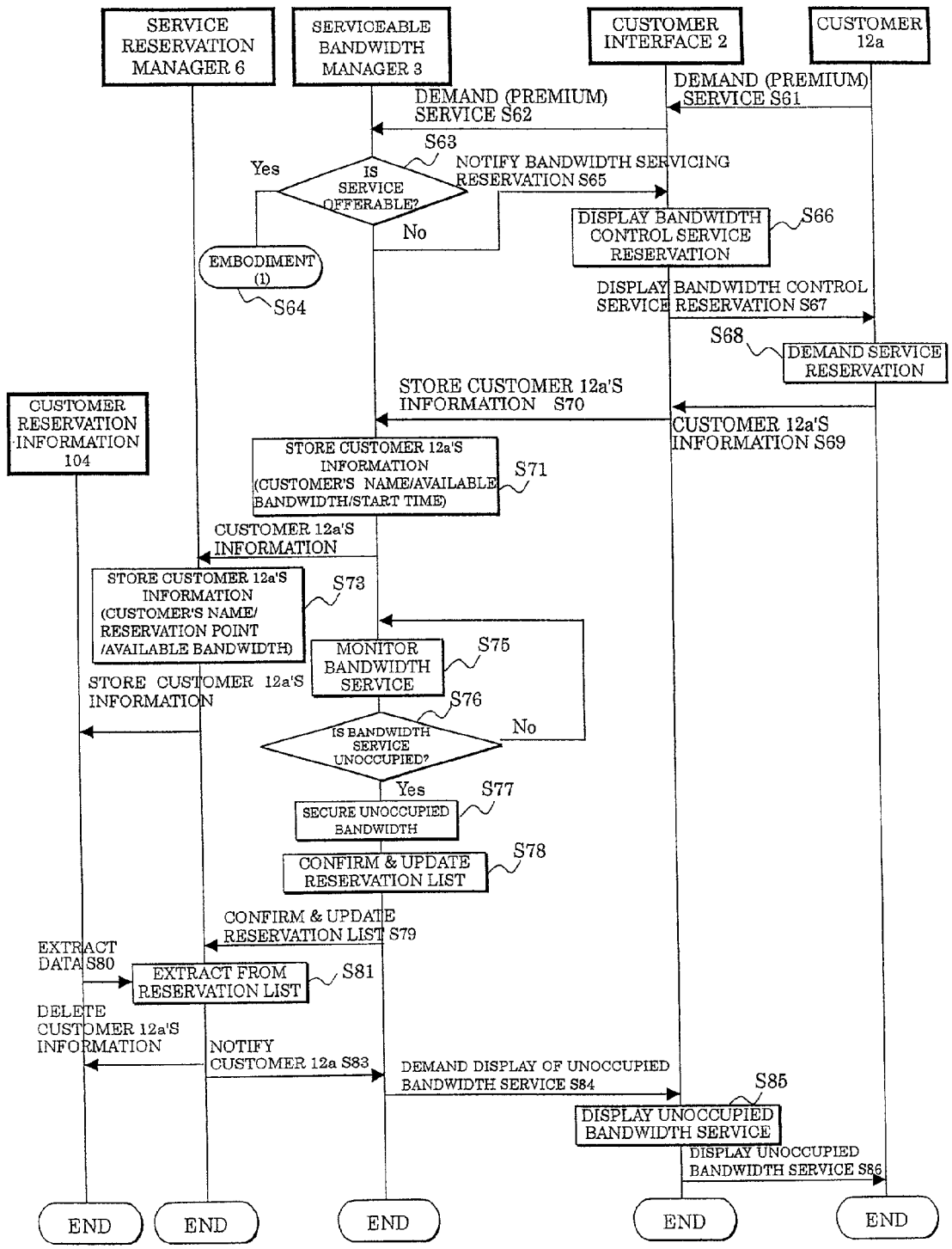
FIG. 8 is a flow chart showing a process example of an embodiment (3) of a bandwidth control service management apparatus according to the present invention.

FIG. 8 shows a process flow of service reservation by an embodiment (3) of a bandwidth control service management apparatus according to the present invention. In this embodiment, in order to perform a service reservation process, the storage device 104 shown in FIG. 2 is connected to the service reservation manager 6. The customer reservation information shown in the following table is stored in the storage device 104.

TABLE 4

Customer reservation information (104)

| Customer's name | Registration point | Available bandwidth |
|---|---|---|
| 12a | t8 | xa |
| 12f | t9 | xf |

Firstly, in the same way as the above embodiment (2), when the demand of the premium bandwidth control service is sent to the serviceable bandwidth manager 3 from the customer (customer 12a in this example) through the customer interface 2 (at steps S61 and S62; at the point of t8 in FIG. 4), there is already no remaining premium bandwidth available in the initial premium bandwidth "X" or the enlarged premium bandwidth "X1" (see Table 1).

Accordingly, the screen on which the customer interface 2 can notify the unserviceable condition and can designate the reservation of the bandwidth control service to the customer 12a is displayed by the serviceable bandwidth manager 3 to the customer 12a (at steps S63 and S65–S67). It is to be noted that when the service is offerable, the same processes as step S4 and the following steps in the above embodiment (1) may be executed (at step S64).

When demanding the reservation of the premium bandwidth control service (at step S68), the customer 12a notifies the reservation information of the customer 12a which is the same as the above embodiment (2) (including the information at the point of reservation in this case) to the serviceable bandwidth manager 3 through the customer interface 2, so that the serviceable bandwidth manager 3 stores the reservation information of the customer 12a in the storage device 103 (at steps S69–S71).

Based on the notified reservation information of the customer 12a, the serviceable bandwidth manager 3 further notifies the reservation information of the customer 12a to the service reservation manager 6 (at step S72). The reservation service manager 6 which has received the notification stores the reservation information of the customer 12a in the storage device 104 (at steps S73 and S74).

The serviceable bandwidth manager 3 always monitors whether or not the available bandwidth of the premium bandwidth control service becomes unoccupied (at steps S75 and S76), and when it becomes unoccupied or empty, the serviceable bandwidth manager 3 secures the unoccupied bandwidth (at step S77), notifies the unoccupied bandwidth information to the service reservation manager 6 to confirm/update a reservation list (at steps S78 and S79).

The service reservation manager 6 takes out the customer 12a information located at the top of the customer reservation information stored in the storage device 104 (at steps S80 and S81), and compares it with the unoccupied bandwidth information. If the unoccupied bandwidth information meets the customer 12a information, the service reservation manager 6 deletes the reservation information of the customer 12a (at step S82), and notifies the customer 12a to the serviceable bandwidth manager 3 (at step S83). In this case, the reservation information is re-linked so that the customer 12f's information to which the service reservation is performed at the point of t7 may assume the top data.

The serviceable bandwidth manager 3 displays that the service is offerable to the customer 12a through the customer interface 2 (at steps S85 and S86). The customer 12a, as shown in the embodiment (1), demands servicing from the serviceable bandwidth manager 3 through the customer interface 2, thereby enabling the premium bandwidth control service.

Embodiment (4)

Figure 9:
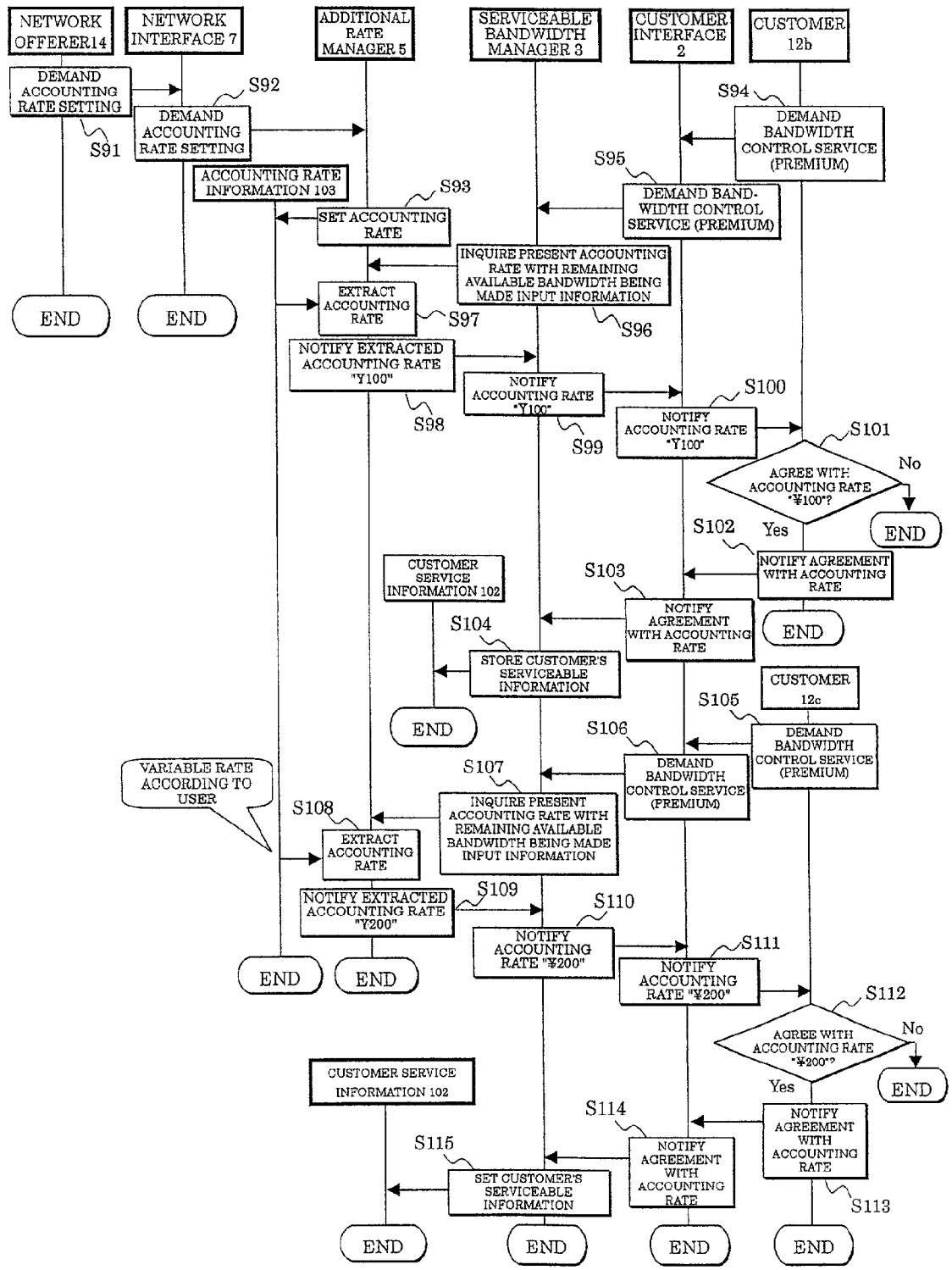
FIG. 9 is a flow chart showing a process example of an embodiment (4) of a bandwidth control service management apparatus according to the present invention.

FIG. 9 shows an accounting process flow by an embodiment (4) of a bandwidth control service management apparatus according to the present invention. In this embodiment, for the accounting process, the storage device 103 is connected to the additional rate manager 5, as shown in FIG. 2.

Firstly, it is assumed that the network offerer 14 can set the accounting rate, as the accounting rate information, which forms the additional rate calculation standard at the time of the bandwidth control servicing according to the bandwidth control servicing status in the storage device 103 through the network interface 7 (at steps S91–S93), and that the setting as shown by the following table is performed.

TABLE 5

Accounting rate information (103)

| Remaining bandwidth number | Rate (¥) | Etc. |
|---|---|---|
| 10 | 100 | — |
| 9 | 200 | |
| 8 | 300 | |
| . | . | |
| . | . | |
| . | . | |
| 1 | 1000 | |

When the bandwidth control service is demanded from the customer 12b at the point of t2 in FIG. 4 (at step S94 and S95), and the service is available, the serviceable bandwidth manager 3 inquires the present accounting rate of the additional rate manager 5 with the remaining available bandwidth being made input information (at step S96). The additional rate manager 5 inquires the accounting rate information of the storage device 103 to extract the same (at step S97). In case that there is no user at present, the accounting rate assumes "¥100" based on Table 5.

The additional rate manager 5 transfers the accounting rate "¥100" to the serviceable bandwidth manager 3 as output information (at step S98), which notifies the accounting rate to the customer 12b through the customer interface 2 (at step S99).

When the customer 12b agrees with the accounting rate "¥100" (at steps S101–S103), the serviceable bandwidth manager 3 sets the customer 12b information shown in the following table, i.e. "customer's name/available bandwidth/service start time/accounting rate" in the storage device 102 in the form of the customer serviceable information (at step S104). This table is the information shown in Table 3 to which the "accounting rate" is added.

TABLE 6

Customer serviceable information before calculation (102)

| Customer's name | Bandwidth | Start point | Accounting rate (¥) |
|---|---|---|---|
| 12b | xb | t2 | 100 |
| 12c | xc | t3 | 200 |
| 12d | xd | t4 | 300 |
| 12e | xe | t7 | 400 |

Next, when the customer 12c demands the bandwidth control service at the point of t3, the same process is executed (at steps S105–S108). Since the customer 12b uses the bandwidth of the accounting rate "¥100" in this case, "¥200" that is an accounting rate for the next remaining bandwidth number, as shown in Table 5, becomes the accounting rate of the customer 12c (at steps S109–S111). If the customer 12c agrees with this accounting rate, the premium bandwidth control service can be received at the accounting rate "¥200".

It is to be noted that while in this embodiment, the accounting rate is set higher in proportion to the remaining available bandwidth as a simple model, it is possible to set not only the accounting rate based on this model but also various accounting rates.

Also in this embodiment, the value of the accounting rate is applied to the additional rate as it is for conveniences' sake. In addition to this, however, it is also possible to set a basic rate per bandwidth unit and to perform a complicated additional rate calculation by linking the basic accounting rate with the applied bandwidth of the premium bandwidth service.

Embodiment (5)

Figure 10:
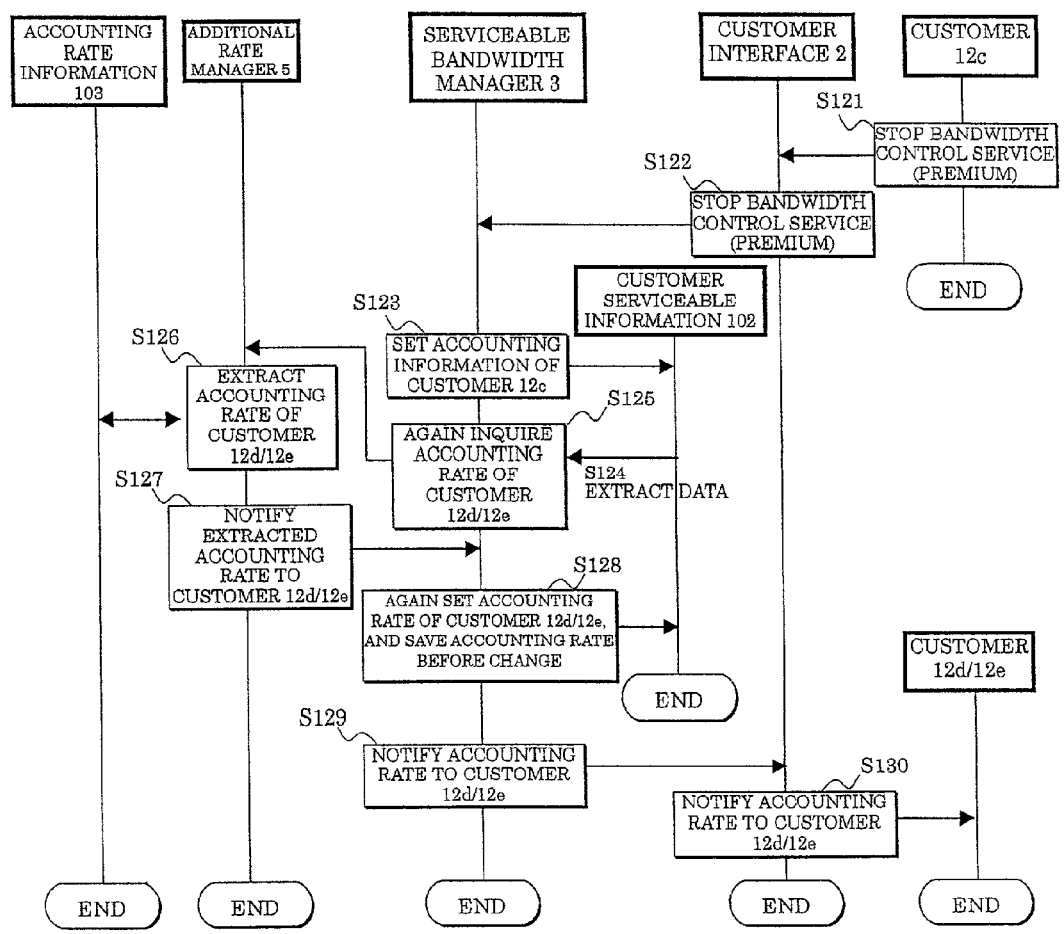
FIG. 10 is a flow chart showing a process example of an embodiment (5) of a bandwidth control service management apparatus according to the present invention.

FIG. 10 shows a process flow of an accounting rate change by a embodiment (5) of a bandwidth control service management apparatus according to the present invention. In this embodiment, the accounting rates for other customers are changed when a certain customer stops using the bandwidth control service, and the accounting rate information stored in the storage device 103 shown in FIG. 2 is also used.

In the above embodiment (4), the accounting rate of the customer 12b assumes "¥100" and that of the customer 12c assumes "¥200" based on Table 5. Assuming that the customers 12d and 12e as the following service users enjoy the premium bandwidth control service, their accounting rates assume respectively "¥300" and "¥400" based on the accounting rates of Table 5, and the customer serviceable information is as shown in the above-mentioned Table 6.

When the service application time of the customer 12c has elapsed (embodiment (2)), or the customer 12c suspends the use of the bandwidth control service in the case where the use of the service is suspended or the like, the accounting rates of the customers 12d and 12e who are using the bandwidth control service at higher accounting rates than the customer 12c are required to be reconsidered.

Therefore, the serviceable bandwidth manager 3 which has received the stop of the service use from the customer 12c (at steps S121 and S122 in FIG. 10) firstly sets the accounting information (service end time, and the like) of the customer 12c in the storage device 102 as the customer serviceable information (at steps S123).

As for the customers 12d and 12e who are using the service at higher accounting rates than the customer 12c, the serviceable bandwidth manager 3 again inquires the respective accounting rates of the customers 12d and 12e of the additional rate manager 5 by referring to the customer serviceable information (at steps S124 and S125).

The additional rate manager 5 inquires the accounting rates of the storage device 103 which stores the accounting rate information, known from Table 5, so that the respective accounting rates are again extracted (at step S126). The additional rate manager 5 notifies the extracted respective accounting rates "¥200" and "¥300" to the serviceable bandwidth manager 3 (at step S127).

The serviceable bandwidth manager 3 accesses the storage device 103 to again set the extracted accounting rates "¥200" and "¥300" as shown in the following table. In that case, the accounting information before the change of the accounting rate is saved in the storage device 102 as the customer serviceable information (at step S128), so that accounting is performed by the changed accounting rate after the change of the accounting rate (at step S129).

TABLE 7

Customer serviceable information before calculation (102)

| Customer's name | Bandwidth | Start point | Accounting rate (¥) |
|---|---|---|---|
| 12b | xb | t2 | 100 |
| 12d | xd | tx | 200 |
| 12e | xe | tx | 300 | tx: point at which customer 12c has released service The serviceable bandwidth manager 3 notifies the new accounting rates to the customers 12d and 12e through the customer interface 2 (at step S130).

Thus, it is possible to always account the additional rate according to the available status of the bandwidth control service.

As described above, in a bandwidth control service management apparatus of the present invention according to claim 1, a customer can use a necessary bandwidth in a premium bandwidth control service for a necessary time when it is necessary without preliminarily contracting. Therefore, it is possible to keep service rates paid to a network offerer inexpensive.

Also, since the network offerer can flexibly change a working condition (applied threshold value of available bandwidth) of the premium bandwidth control service according to the capacity of its own network resource or the like, a stable quality can always be offered to the customer. Furthermore, since an acceptance of service, the determination of serviceability, execution of service, notification to a customer, and the like can be automatically performed according to a servicing condition preliminarily designated without a maintenance person who lies therebetween, a servicing cost can be reduced.

Moreover, according to the present invention, bandwidth information necessary for servicing is collected and nodes in the network are controlled in cooperation with the network. Therefore, it is not necessary to equip each node with apparatuses required for managing the premium bandwidth control service. Also, there are functions for notifying information relating to the premium bandwidth control service to the customer and for accepting a service demand from the customer. Therefore, the customer is not required to equip therewith a special apparatus.

Also, in the present invention according to claim 2, the bandwidth control service is automatically released when an application time which the customer designated has elapsed. Therefore, an extra use of the service by the customer can be restrained, a customer's unnecessary payment for service rates can be prevented, enabling more customers to use the premium bandwidth control service.

Also, in the present invention according to claim 3, the customer whose premium bandwidth control service demand was rejected due to the limit of a network resource and a servicing condition can preferentially use the service by a reservation when the network resource becomes unoccupied. Therefore, it is possible to awaken the serviceability.

Also, in the present invention according to claim 4, the accounting rate changes according to the status of the network resource. Therefore, it is possible to offer a bandwidth control service within the limited network resource at an adequate rate and at all times with a quality contracted with the customer.

Furthermore, by the present invention according to claim 5, the accounting rate of the customer who are using the service becomes inexpensive for the bandwidth released by another customer, thereby enabling the customer to use the service at a lower rate.

What we claim is:

1. A bandwidth control service management apparatus of a network operated by a network offerer and a customer comprising:

a customer interface for accepting, from the customer, an available bandwidth of a premium bandwidth control service demand with a higher priority than a regular bandwidth control service of best effort type, wherein the premium bandwidth control service demand is for changing the regular bandwidth control service of best effort type to the premium bandwidth control service, a network interface for accepting an applied threshold value of the premium bandwidth control service within the entire network from the network offerer, and a serviceable bandwidth manager for comparing an available bandwidth of the premium bandwidth control service demand with the applied threshold value to determine whether or not the premium bandwidth control service is available, for notifying the result to the customer through the customer interface, and for demanding that the network should secure a bandwidth in order that the customer who has received the notification of a service permission can start the premium bandwidth control service when the premium bandwidth control service is determined to be available, the serviceable bandwidth manager transmitting to the network offerer a present applied threshold value in response to a collection demand by the network offerer, and adopting a changed applied threshold value for the determination when the network offerer has changed the applied threshold value.

2. The bandwidth control service management apparatus as claimed in claim 1 wherein a timer manager is provided which monitors an applied rime of the premium bandwidth control service received by the customer through the customer interface, and which demands a release of the premium bandwidth control service from the serviceable bandwidth manager, when the applied time has elapsed.

3. The bandwidth control service management apparatus as claimed in claim 1 wherein a service reservation manager is provided which reserves and manages a customer whose premium bandwidth control service demand is rejected by the serviceable bandwidth manager, and which notifies to the customer that the premium bandwidth control service becomes available at that time, based on the applied threshold value.

4. The bandwidth control service management apparatus as claimed in claim 1 wherein an additional rate manager is provided which manages an accounting rate set according to a remaining bandwidth of the premium bandwidth control service and forming an additional rate calculation standard, and which notifies the accounting rate corresponding to the remaining bandwidth of the premium bandwidth control service at a time when a service is demanded by the customer to the serviceable bandwidth manager, while the premium bandwidth control service is offered.

5. The bandwidth control service management apparatus as claimed in claim 4 wherein when the customer releases the premium bandwidth control service, the additional rate manager changes the accounting rate to a new accounting rate considering the released bandwidth for accounting.

* * * * *